United States Patent Office 2,725,406
Patented Nov. 29, 1955

2,725,406

DEHYDROCHLORINATION

Lucy Glaser, Detroit, Mich., now by marriage, Lucy Merritt, assignor to Ethyl Corporation, New York, N. Y., a corporation of Delaware No Drawing. Application January 23, 1952,
Serial No. 267,925

2 Claims. (Cl. 260—650)

This invention relates to dehydrohalogenation of organic halogen compounds and more particularly to a new improved catalytic method for the dehydrochlorination of chlorocycloaliphatics of the type typified by benzene hexachloride, heptachlorocyclohexane and the like.

The important insecticide benzene hexachloride (1,2,3,4,5,6-hexachlorocyclohexane), is produced commercially by the chlorination of benzene with chlorine under conditions conducive to addition rather than substitution chlorination. When produced by this method the content of the insecticidally active gamma isomer is never more than about 17 per cent of the total technical benzene hexachloride produced. The remaining 83 per cent or more of inactive isomers have little utility as such and it is important to successful commercial operation that they be converted to marketable derivatives. The principal method of so converting these waste benzene hexachloride isomers is by dehydrochlorination to trichlorobenzenes. Anhydrous ferric chloride is frequently used in catalytic quantities to enhance the thermal dehydrochlorination of benzene hexachloride. The reaction rate with catalytic amounts of ferric chloride is rather slow and tends to limit the amount of production of trichlorobenzenes per unit of processing equipment.

An object of my invention is to provide a new catalytic method for the dehydrohalogenation of organic halogen compounds. A further object is to provide a new and improved catalytic process for the dehydrochlorination of alicyclic chloro compounds. An additional object is to provide a new method for the dehydrochlorination of benzene hexachloride. Still another object is to increase the rate of dehydrochlorination of benzene hexachloride.

Broadly, the present invention comprises heating a polychlorocyclohexane in the presence of a dehydrochlorination catalyst while introducing minor amounts of an elemental halogen to the reaction mixture in total quantity not more than 4 per cent by weight of the polychlorocyclohexane being treated. When greater ratios of elemental halogen to polychlorocyclohexane are used, undesirable side reactions, such as the formation of hexachlorobenzene, take place. When using the proportions of my process, however, no hexachlorobenzene has been isolated, although trace amounts of tetrachlorobenzenes may be found in the reaction mixture when benzene hexachloride is used as the starting material. A preferred embodiment of the invention comprises contacting benzene hexachloride and a cracking catalyst at an elevated temperature with minor amounts of elemental halogen in total quantity of not more than 4 per cent by weight of the amount of benzene hexachloride to be treated. An embodiment which I especially prefer comprises heating non-gamma benzene hexachloride isomers in the presence of minor amounts of a Friedel-Crafts type catalyst such as ferric chloride or a surface-active catalyst such as finely divided carbon while introducing chlorine as a promoter in total quantity of not more than 4 per cent by weight of the amount of benzene hexachloride treated at temperatures of 180–400° C. However, any pure benzene hexachloride isomer or any mixture of benzene hexachloride isomers may be used. Any dehydrochlorination catalyst may be employed. Examples are ferric chloride, aluminum chloride, antimony pentachloride, sodium chloride, cuprous chloride, sodium nitrite, ammonia and other aminoid compounds, finely divided carbon, anion exchange resins, alumina, silica, diatomaceous earths and so forth. I prefer to employ the Friedel-Crafts type catalysts such as ferric chloride, aluminum chloride, stanic chloride, antimony pentachloride, boron trifluoride and the like, and also surface-active catalysts, such as finely divided carbon and the like. This catalyst may be employed in amounts up to about 10 per cent of the benzene hexachloride being treated.

As the promoter any member of the halogen family may be used. Chlorine is particularly preferred because of its low cost. As mentioned above, the amount of this promoter employed should be limited to not more than 4 per cent of the weight of polychlorocyclohexane to be treated, in order to avoid undesirable side reactions.

In general elevated temperatures are required in my process. At temperatures below 180° C. the reaction rate is rather slow even with my promoters. At temperatures above 400° C. the process is complicated by carbonization of organic material in the reaction zone. For convenience and simplicity, therefore, I prefer to operate at temperatures lying between 180 and 400° C. Although pressures at or near atmospheric are preferred, it is possible and frequently desirable to use pressures elevated above atmospheric, as well as those reduced below atmospheric.

The following examples will illustrate results obtained when one embodiment of my invention is used. In contrast, results obtained using a prior art catalyst alone are also presented.

Example I

In a reaction vessel equipped with a reflux condenser and gas inlet and outlet tubes was placed 500 parts of non-gamma benzene hexachloride containing 0.5 per cent by weight of anhydrous ferric chloride. The outlet gas tube was connected to a trap containing water to absorb evolved hydrogen chloride. The reaction mixture was heated with the exclusion of direct light to a temperature of 240° C. Chlorine was added through the gas inlet tube to the reaction mixture at the rate of 0.11 part per minute. After twenty minutes of chlorine addition, 2.98 parts of hydrogen chloride had been evolved and collected in the hydrogen chloride trap. Correcting this amount of hydrogen chloride for the equivalent amount of chlorine consumed in the conversion of trichlorobenzene to tetrachlorobenzenes the net hydrogen chloride evolution for the 20 minute period is 1.85 parts.

Example II 500 parts of benzene hexachloride containing 0.5 per cent by weight of anhydrous ferric chloride was treated in a manner identical to that in Example I except that there was no addition of chloride to the reaction mixture. The amount of hydrogen chloride evolved and collected in 20 minutes was 0.095 part.

From the foregoing, it is seen that the rate of dehydrohalogenation from benzene hexachloride is increased almost 20-fold when my process is employed.

When finely divided carbon is substituted for the ferric chloride of Example I, with all other conditions being held the same, substantially identical results are obtained. When this procedure is repeated at temperatures as low as 180° C. and as high as 400° C. equally beneficial results are obtained. Other halogen compounds such as heptachlorocyclohexane, octachlorocyclohexane and the like can be dehydrohalogenated in like manner as can other mixtures of benzene hexachloride isomers, and the individual isomers. Equally beneficial results are obtained when other elemental halogens such as bromine and iodine, are used as promoters and when other catalysts such as cuprous chloride, anion exchange resins and so forth are employed.

I claim:

1. In a process for the production of trichlorobenzenes by dehydrochlorination of benzene hexachloride at temperatures of 180–400° C. in the presence of a dehydrochlorination catalyst, the improvement comprising introducing minor amounts of chlorine to the reaction mixture, the total amount of chlorine introduced being not more than 4 per cent by weight of the amount of benzene hexachloride treated and thereafter recovering a trichlorobenzene product having only trace quantities of higher chlorinated benzenes.

2. The process of claim 1 wherein the dehydrochlorination catalyst is anhydrous ferric chloride.

References Cited in the file of this patent

UNITED STATES PATENTS

| | | |
|---|---|---|
| 2,378,859 | Mugdan et al. | June 19, 1945 |
| 2,569,441 | Alquist et al. | Oct. 2, 1951 |
| 2,593,451 | Hill et al. | Apr. 22, 1952 |